United States Patent [19]

He et al.

[11] Patent Number: 5,798,982
[45] Date of Patent: Aug. 25, 1998

[54] METHOD FOR INVERTING REFLECTION TRACE DATA FROM 3-D AND 4-D SEISMIC SURVEYS AND IDENTIFYING SUBSURFACE FLUID AND PATHWAYS IN AND AMONG HYDROCARBON RESERVOIRS BASED ON IMPEDANCE MODELS

[75] Inventors: Wei He, New Milford, N.J.; Roger N. Anderson, New York, N.Y.

[73] Assignee: The Trustees of Columbia University in the City of New York, New York, N.Y.

[21] Appl. No.: 641,069

[22] Filed: Apr. 29, 1996

[51] Int. Cl.[6] .................... G06F 19/00; G01V 1/13; G01V 1/28
[52] U.S. Cl. .................... 367/73; 367/28; 367/29; 364/421; 364/422
[58] Field of Search .................... 367/28, 29, 73; 364/421, 422

[56] References Cited

U.S. PATENT DOCUMENTS

| | | |
|---|---|---|
| 3,697,938 | 10/1972 | Taner . |
| 3,885,225 | 5/1975 | Anstey et al. . |
| 3,898,610 | 8/1975 | Pennebaker, Jr. . |
| 4,072,922 | 2/1978 | Taner et al. . |
| 4,259,733 | 3/1981 | Taner et al. . |
| 4,363,113 | 12/1982 | Taner et al. . |
| 4,479,204 | 10/1984 | Silverman . |
| 4,821,164 | 4/1989 | Swanson . |
| 4,926,394 | 5/1990 | Doyen .................... 364/421 |
| 4,969,130 | 11/1990 | Wason .................... 367/73 |
| 4,972,383 | 11/1990 | Lailly .................... 367/73 |
| 5,235,556 | 8/1993 | Monk et al. . |
| 5,311,484 | 5/1994 | Anderson et al. . |
| 5,444,619 | 8/1995 | Hoskins et al. .................... 364/421 |

OTHER PUBLICATIONS

P. A. Grivelet, "Inversion of Vertical Seismic Profiles By Iterative Modeling", Geophysics, vol. 50, No. 6, Jun. 1985, pp. 924–930, XP002040370; see p. 924, col. 2, lines 29–36; see p. 925, col. 2, lines 6–36; see Figure 1B.

D. A. Cooke et al., "Generalized Linear Inversion of Reflection Seismic Data", Geophysics, vol. 48, No. 6, Jun. 1983, pp. 665–676, XP002040423, see Figure 4.

I. Pitas, A.N. Venetsanopoulos, "Knowledge–Based Image Analysis for Geophysical Intrepretation," *Journal of Intelligent and Robotic Systems*, 7:115–137, 1993.

(List continued on next page.)

*Primary Examiner*—Nelson Moskowitz
*Attorney, Agent, or Firm*—Baker & Botts, L.L.P.

[57] ABSTRACT

A method is disclosed for inverting 3-D seismic reflection data obtained from seismic surveys to derive impedance models for a subsurface region, and for inversion of multiple 3-D seismic surveys (i.e., 4-D seismic surveys) of the same subsurface volume, separated in time to allow for dynamic fluid migration, such that small scale structure and regions of fluid and dynamic fluid flow within the subsurface volume being studied can be identified. The method allows for the mapping and quantification of available hydrocarbons within a reservoir and is thus useful for hydrocarbon prospecting and reservoir management. An iterative seismic inversion scheme constrained by actual well log data which uses a time/depth dependent seismic source function is employed to derive impedance models from 3-D and 4-D seismic datasets. The impedance values can be region grown to better isolate the low impedance hydrocarbon bearing regions. Impedance data derived from multiple 3-D seismic surveys of the same volume can be compared to identify regions of dynamic evolution and bypassed pay. Effective Oil Saturation or net oil thickness can also be derived from the impedance data and used for quantitative assessment of prospective drilling targets and reservoir management.

27 Claims, 12 Drawing Sheets

OTHER PUBLICATIONS

"Segmentation," *Encyclopedia of Artificial Intelligence*, vol. 2 M–Z, Second Edition, pp. 1473–1491, 1992.

E.A. Breitenbach, G.A. King, K.N.B. Dunlop, "The Range of Application of Reservoir Monitoring," SPE 19853, 1989.

K.N.B. Dunlop, G.A. King, E.A. Breitenbach, "Monitoring of Oil/Water Fronts by Direct Measurement," SPE 18271, 1988.

Milton B. Dorin, Carl H. Savit, *Introduction to Geophysical Prospecting*, Fourth Edition, 1988.

William E. Lorensen, Harvey E. Cline, "Marching Cubes: A High Resolution 3D Surface Construction Algorithm," *Computer Graphics*, vol. 21, No. 4, Jul. 1987.

Amos M. Nur, "Seismic Imaging in Enhanced Recovery," SPE/DOE 10680, 1982.

N.A. Anstey, *Simple Seismics*, 1982.

M.T. Taner, F. Koehler, R.E. Sheriff, "Complex Seismic Trace Analysis," *Geophysics*, vol. 44, No. 6 (Jun. 1979), pp. 1041–1063.

A. Bamberger, G. Chavent, Ch. Hemon, and P. Lailly, 1982, "Inversion of Normal Incidence Seismograms," *Geophysics*, v. 47, pp. 757–770.

A. Tarantola and B. Valette, 1982, "Inversion=Quest For Information," *Geophysics*, v. 50, pp. 159–170.

S.H. Gray and W. Symes, 1984, "Stability Considerations For One–Dimensional Inverse Problems," *Geophysical Journal of the Royal Astronomical Society*, v. 80, pp. 149–163.

W. Menke, 1984, "Geophysical Data Analysis—Discrete Inverse Theory," Academic Press, Inc., Orlando, FL.

R.G. Keys, 1986, "An Application of Marquardt's Procedure To The Seismic Inverse Problem," *Proceedings of the IEEE*, v. 74, pp. 476–486.

B.L.N. Kennet, M.S. Sambridge, and P.R. Williamson, 1988, "Subspace Methods For Large Inverse Problems With Multiple Parameter Classes," *Geophysical Journal of the Royal Astronomical Society*, v. 82, pp. 237–247.

J. More, 1977, "The Levenberg–Marquardt Algorithm, Implementation and Theory," *Numerical Analysis*, G.A. Watson, Editor, Lecture Notes in Mathematics 630, Spring-–Verlag.

J. Brock, 1984, Analyzing Your Logs, vol. II: Advanced Open Hole Log Interpretation, Petromedia.

G.H.F. Gardner, L.W. Gardner, and A.R. Gregory, 1974, "Formation Velocity and Density—The Diagnostic Basics For Stratigraphic Traps," *Geophysics*, v. 39, No. 6, pp. 770–780.

A. Tarantola, 1984, "Inversion of Seismic Reflection Data in The Acoustic Approximation," *Geophysics*, v. 49, pp. 1259–1266.

K. Levenberg, 1944, "A Method For The Solution of Certain Nonlinear Problems in Least Squares," *Quarterly of Applied Mathematics*, v. 2, pp. 164–168.

D.W. Marquardt, 1963, "Algorithm For Least–Squares Estimation of Nonlinear Parameters," *Journal of Society of Industrial and Applied Mathematics*, v. 11, pp. 431–441.

R. Martinez, J. Schroeder, and G. King, 1991, "Formation Pressure Prediction With Seismic Data From Gulf of Mexico," *Society of Petroleum Eng., Formation Evaluation*, No. 3, pp. 27–32.

R. Sheriff and L. Geldart, 1983, "Data Processing and Interpretation," *Exploration Seismology*, vol. II, Cambridge Univ. Press, p. 123.

P. Doyan and T. Guidish, 1992, "Seismic Discrimination of Lithology and Porosity, a Monte Carlo Approach," *Reservoir Geophysics*, R.E. Sheriff, Editor, pp. 243–250.

L. Coudert, M. Frappa, and R. Arias, "A Statistical Method For Litho–facies Identification," *Journal of Applied Geophysics*, vol. 32, 1994, pp. 257–267.

E. Robinson, "Predictive Decomposition of Time Series With Application to Seismic Exploration," *Geophysics*, 161.32, pp. 418–484.

A. Tarantola and B. Valette, "Generalized Nonlinear Inverse Problems Solved Using the Least Squares Criterion," *Reviews of Geophysics and Space Physics*, vol. 20, No. 2 (May 1982), pp. 219–232.

He et al, Annu. AAPG–SEPM–EMD–DPA–DEG Conv., Jun. 15, 1994, p. 167; abst. only herewith.

Fabre et al, 59th Annu. Soc. Explor. Geophys. Int. Ortg., Nov. 2, 1989, vol. 2, pp. 943–945; abst. herewith.

Broc et al, 58th Annu. Soc. Explor. Geophys. Int. Ortg., Nov. 3, 1988, vol. 2, pp. 841–844; abst. herewith.

Hunn et al, 58th Annu. SPE et al Archive Conf. May 18, 1995; abst only herewith.

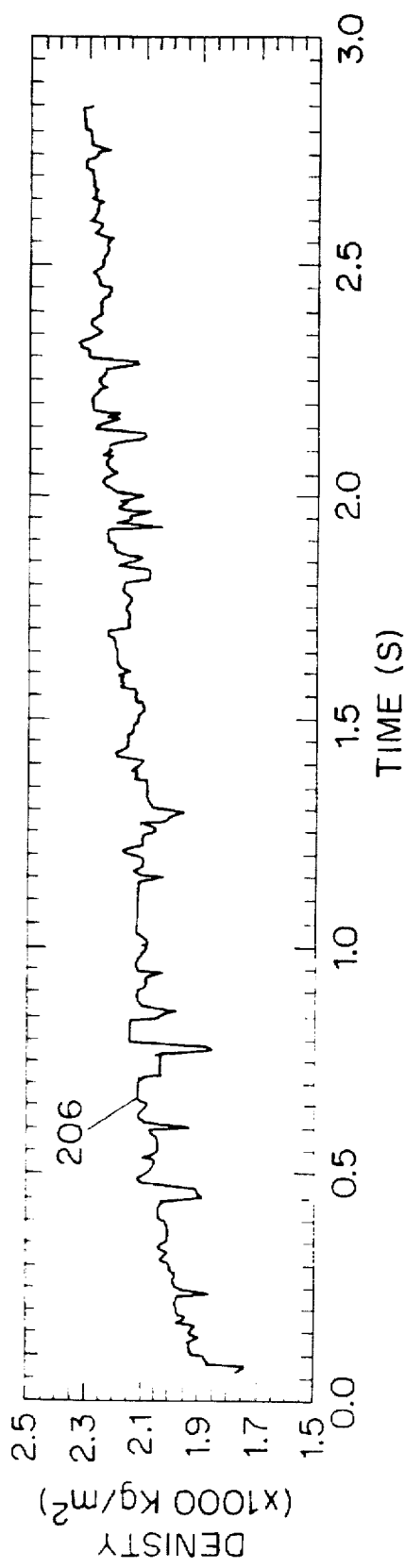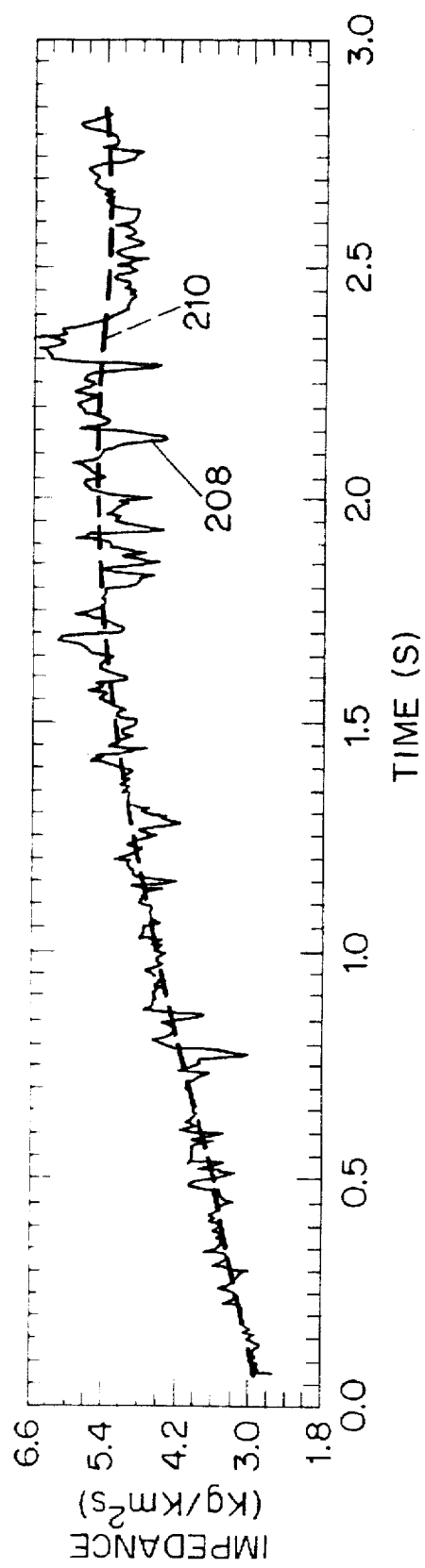

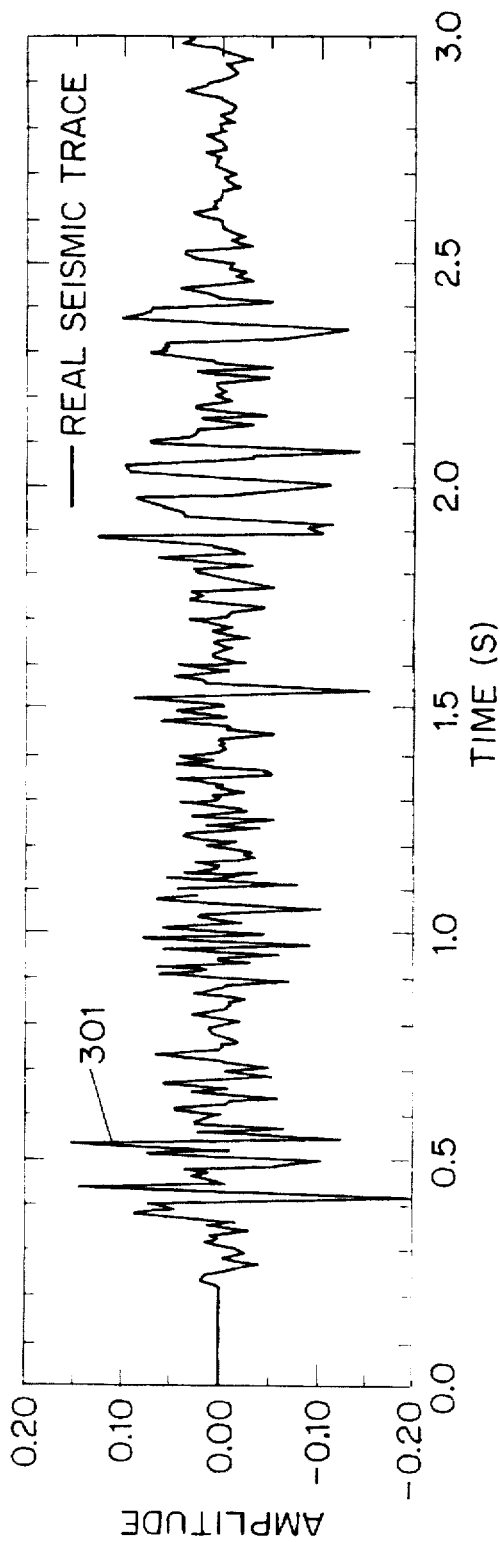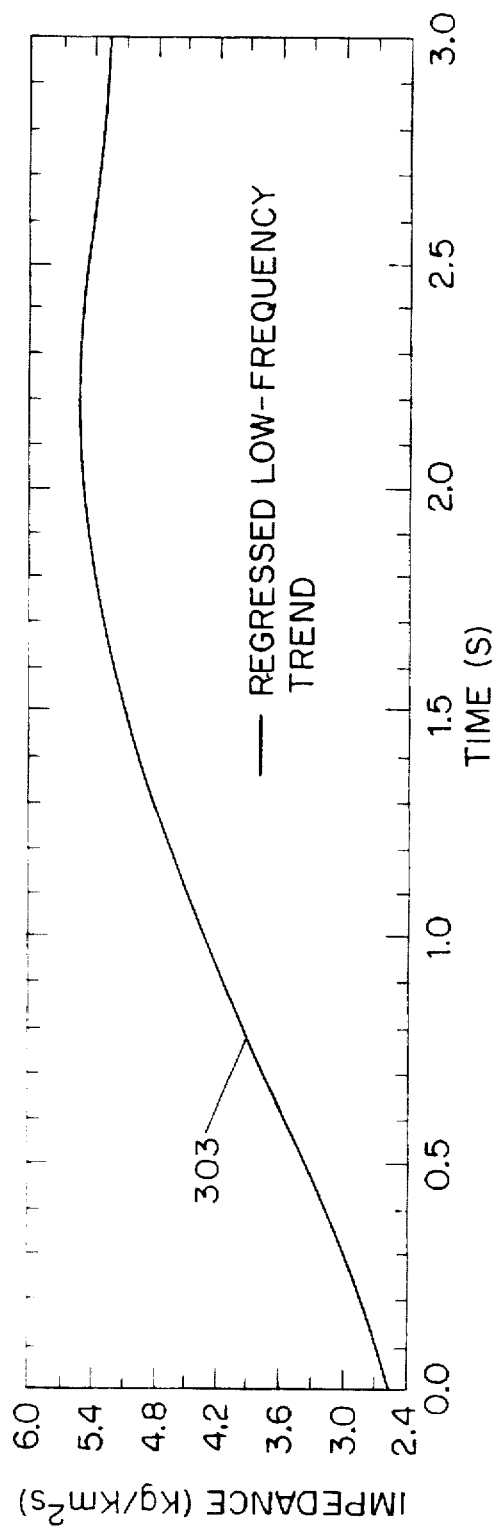
FIG. 3(a)
FIG. 3(b)

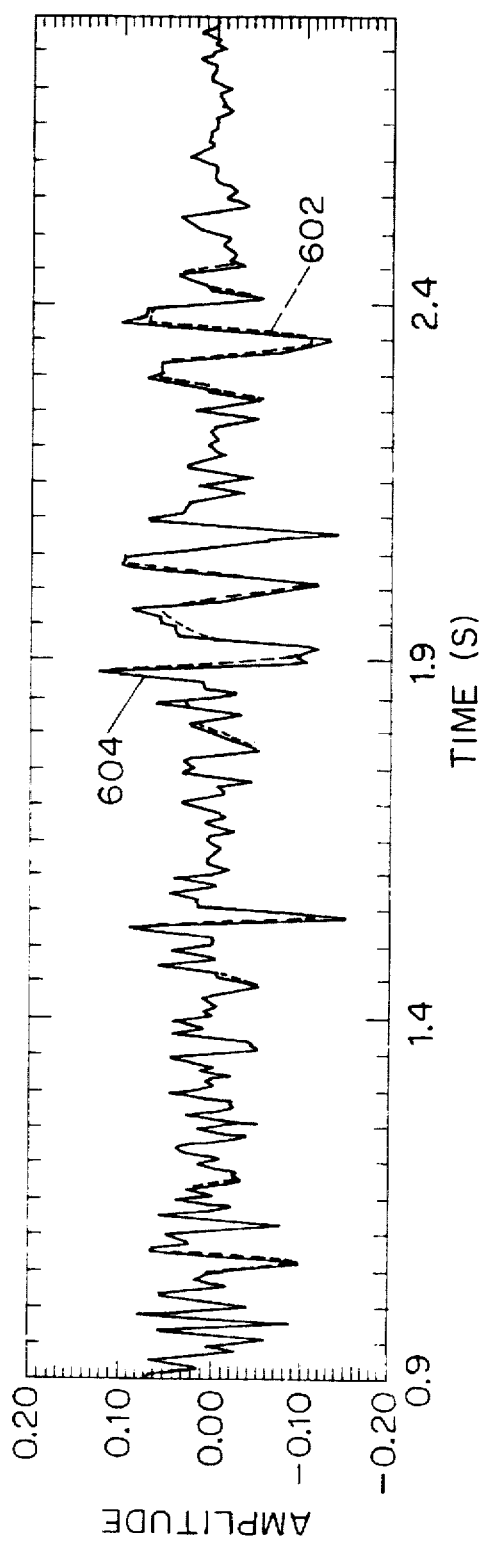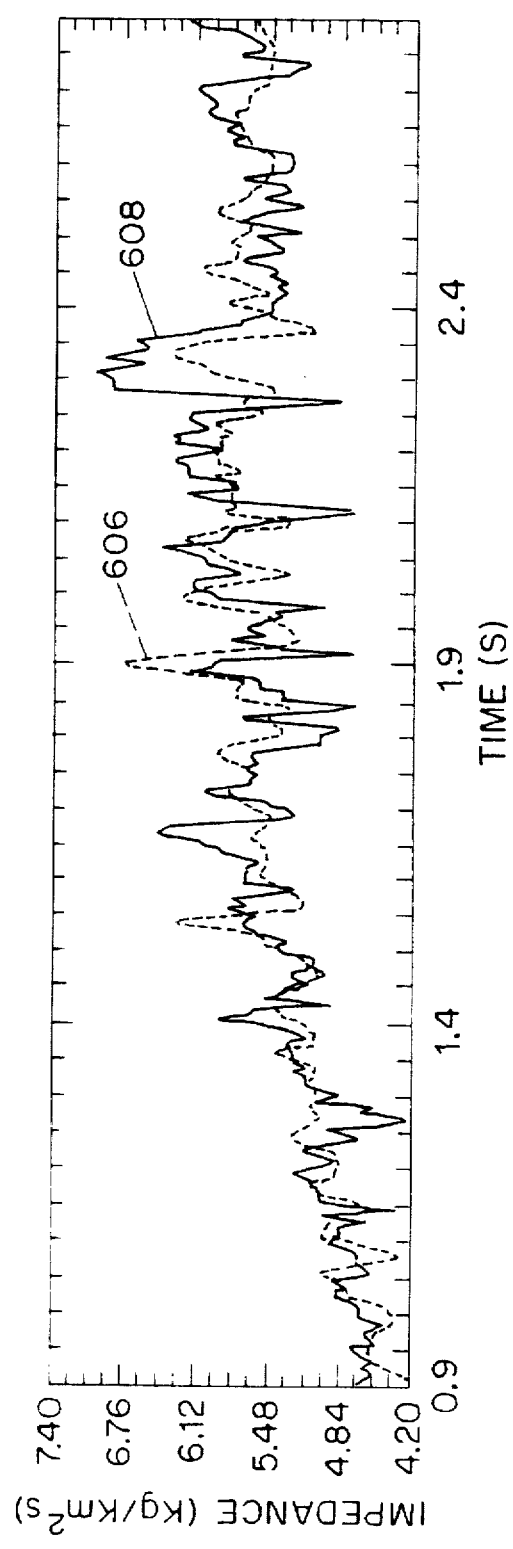

HRZ: Averaged Porosity times Oil Saturation of the LF Sand (0.108, 0.272)

MV |←—→|
   440 m

METHOD FOR INVERTING REFLECTION TRACE DATA FROM 3-D AND 4-D SEISMIC SURVEYS AND IDENTIFYING SUBSURFACE FLUID AND PATHWAYS IN AND AMONG HYDROCARBON RESERVOIRS BASED ON IMPEDANCE MODELS

The U.S. Government has certain rights to this invention and any patents covering this invention as provided for by the terms of Contract No. DE-FC22-93BC14961 awarded by the Department of Energy.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

A microfiche Appendix containing source code listing utilized in practicing the invention is included as part of the specification and is hereinafter referred to as Appendix I. Appendix I includes one microfiche labeled compute__volume__impedance with 54 frames.

BACKGROUND OF THE INVENTION

Differences between seismic amplitudes derived from multiple vintages of 3-D seismic reflection surveys have been used to identify hydrocarbon migration and drainage pathways as disclosed in previously filed patent application for "Method for Identifying Subsurface Fluid Migration and Drainage Pathways in and Among Oil and Gas Reservoirs using 3-D and 4-D Seismic Imaging," Ser. No. 08/398,371 filed Mar. 2, 1995, which issued on Dec. 17, 1996 as U.S. Pat. No. 5,586,082, incorporated in full herein by reference (hereinafter "the Previous Application"). The present invention relates generally to the field of seismic imaging and analysis of hydrocarbon bearing subsurface volumes.

Geophysical inversion is the estimate of a set of physical parameters which best describe a postulated earth model through the fitting of a theoretical prediction (model response) to a set of observations. A typical inverse problem involves a forward model which is predicted by theory and an inverse model which allows determination of the variation between the observation and the theoretical prediction.

Inversion of seismic waveforms for rock and pore fluid elastic parameters is perhaps the most challenging inverse problem encountered in exploration geophysics, even though great progress on seismic inversion theory and practice have been made in the last decade by numerous authors (see, e.g., A. Bamberger, G. Chavent, Ch. Hemon, and P. Lailly, 1982, "Inversion of Normal Incidence Seismograms," *Geophysics*, v. 47, pp. 757–770; A. Tarantola and B. Valette, 1982, "Inversion=Quest For Information," *Geophysics*, v. 50, pp. 159–170; S. H. Gray and W. Symes, 1984, "Stability Considerations For One-Dimensional Inverse Problems," *Geophysical Journal of the Royal Astronomical Society*, v. 80, pp. 149–163; W. Menke, 1984, "Geophysical Data Analysis—Discrete Inverse Theory," Academic Press, Inc., Orlando, Fla.; R. G. Keys, 1986, "An Application of Marquardt's Procedure To The Seismic Inverse Problem," *Proceedings of the IEEE*, v. 74, pp. 476–486; and B. L. N. Kennet, M. S. Sambridge, and P. R. Williamson, 1988, "Subspace Methods For Large Inverse Problems With Multiple Parameter Classes," *Geophysical Journal of the Royal Astronomical Society*, v. 82, pp. 237–247). Many global and local optimization algorithms developed in applied mathematics and statistics as used by these previous works have been applied to seismic inversion as the model parameter searching techniques. Theoretically, the global optimization algorithms may be the best inverse problem solver, but the Monte-Carlo search for the best set of model parameters is often computationally too expensive to realize on modern computer workstations (particularly when the number of model parameters is large as in seismic inversions). In contrast, local optimization algorithms are computationally inexpensive, and the convergence criteria of a specific objective function (usually at machine precision) can usually be reached in a matter of several iterations. However, the optimized model parameters will not be a unique solution to the inverse problem. Because there are a large number of model parameters involved in the seismic inverse problem, various local optimization algorithms are widely used. A local minimization algorithm is used herein as the inverse problem solver in the nonlinear inversion technique disclosed.

SUMMARY OF THE INVENTION

The present invention concerns a method for inverting seismic waveforms into impedance models of a subsurface region and an improved method that utilizes 3-D and 4-D time-dependent changes in acoustic impedances inverted from seismic waveforms to make quantitative estimates of the petrophysical property changes in hydrocarbon reservoirs and drainage and migration of oil, gas and water. The invention is an improvement to the Previous Application in that actual physical properties of the subsurface region, i.e., impedance profiles, are inverted from seismic surveys and used to analyze hydrocarbon bearing regions. Unlike seismic amplitudes, which measure relative acoustic impedance changes of reservoirs, the acoustic impedance is directly associated with petrophysical properties of sedimentary rocks and the fluids that fill pore spaces. A 4-D seismic inversion technique is the bridge connecting reflection seismic differences and rock petrophysical property changes related to time-dependent changes in oil and gas volumes within reservoirs.

It was not until several years ago that the inverted acoustic impedance volumes from 3-D seismic surveys gradually began to be used in reservoir characterization to study static hydrocarbon distributions in reservoirs. Most seismic inversion methods are rather simple and do not account for all aspects of seismic wave propagation (e.g., the run-sum technique).

The 4-D seismic inversion used in the preferred embodiment is a robust, nonlinear, least-squares minimization technique which can be used for computing the changes in acoustic impedance over time caused by fluid migration and drainage in the subsurface. A one-dimensional nonlinear inversion technique is used to invert vertical seismic traces to obtain acoustic impedance as a function of two-way travel time. The technique of the preferred embodiment uses a convolution forward model to compute the seismic trace from the acoustic impedance function. A modified Levenberg-Marquardt minimization algorithm (see, e.g., J. More, 1977, "The Levenberg-Marquardt Algorithm, Implementation and Theory," *Numerical Analysis*, G. A. Watson, Editor, Lecture Notes in Mathematics 630, Spring-Verlag) is implemented to solve the nonlinear inverse problem. The gradients of the model response versus acoustic impedance are used at each iteration to update the acoustic impedance model continuously. In forward modeling of the seismic response in the preferred embodiment, the seismic wavelets or seismic source functions are dynamically extracted in time/depth dependant form from each seismic trace of each survey independently. The acoustic impedance model is initially constrained to an a priori low-frequency impedance model constructed using acoustic logs measured in wells.

The features of the nonlinear seismic inversion technique used herein are useful in the analysis of 4-D (time-lapse) seismic datasets. That is, the time/depth variant, dynamic wavelet extraction may be designed to eliminate the differences caused by most of the post-stack seismic processes applied to the various 3-D seismic datasets used in the 4-D analysis. Therefore, the use of the inversion for the determination of 4-D acoustic impedance volumes can significantly increase the accuracy of fluid migration and drainage pathway identification and further quantify the results obtained from the 4-D amplitude differencing studies previously undertaken using seismic amplitude data, as in the Previous Application.

Following computation of impedance models using the described inversion technique for multiple 3-D seismic surveys for the same volume of interest separated in time to allow for dynamic fluid migration, hydrocarbon bearing regions of interest are identified based on derived impedanced characteristics. Region growing and differencing of impedance values between surveys may then be done to identify areas of dynamic evolution, regions of bypassed pay and, hence, promising hydrocarbon prospecting locations. Actual amounts of available hydrocarbons may also be quantified by converting impedance to Effective Oil Saturation or net oil thickness when applying our 3-D and 4-D techniques.

BRIEF DESCRIPTION OF THE DRAWINGS

FIGS. 2(b) and 2(c) respectively show the velocity and density logs measured in the existing well.

FIG. 2(d) shows the impedance log that is derived from the combination of the velocity and density logs along with the impedance trend.

FIG. 3(a) shows a seismic amplitude trace from a 3-D seismic survey.

FIG. 3(b) shows the low frequency trend of the impedance at the same location.

FIGS. 6(a) and 6(b) respectively show the results of a test comparison between modeled and measured amplitude and impedance data along a vertical trace at a known well location.

DETAILED DESCRIPTION

A detailed description of a preferred embodiment of the invention will now be presented with reference to the attached figures.

The time-lapse 3-D seismic surveys that are necessarily used for both the reflection strength differencing and the acoustic impedance differencing analyses of the preferred embodiment disclosed herein were acquired with different orientations and spacings, and processed with different parameters by different geophysical service companies. The surveys used are the same as those described in the Previous Application and cover a known hydrocarbon bearing region in the Gulf of Mexico off Louisiana and date from 1985 (Time 1) and 1992 (Time 2). The "LF Reservoir" within this region was extensively studied.

Figure 1A:
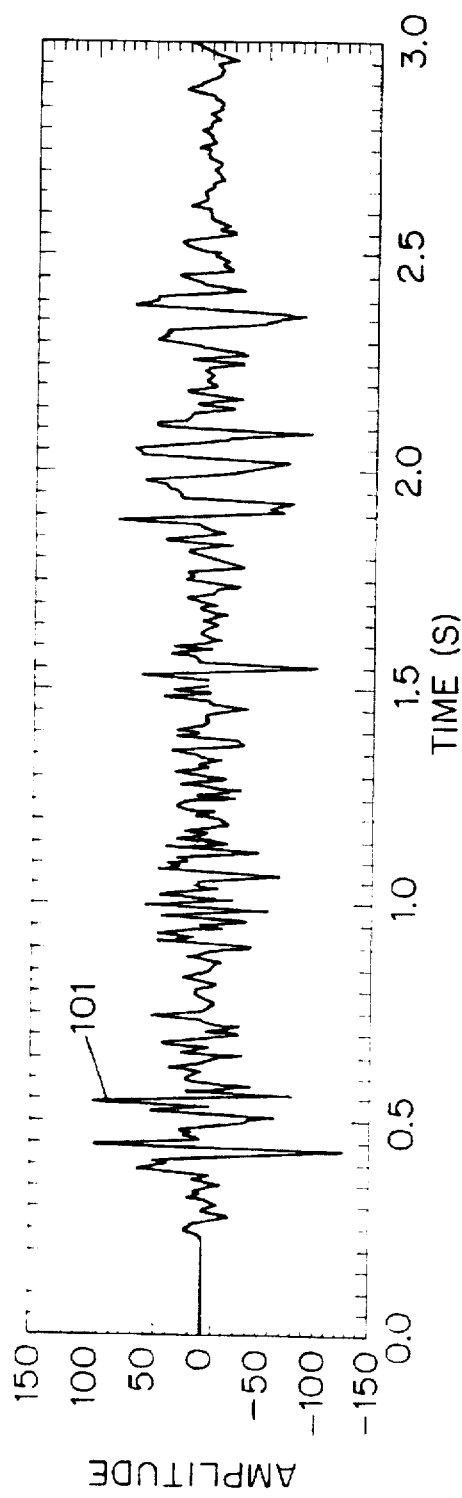
FIGS. 1(a) and 1(b) show two seismic traces extracted from Time 1 (1985) and Time 2 (1992) 3-D seismic surveys along the same vertical path within the subsurface volume.

FIGS. 1(a) and (b) show two representative traces (101) and (103) from the 3-D seismic surveys acquired at Times 1 (1985) and 2 (1992), respectively, at the same location within the subsurface. Despite the obvious differences in waveform characteristics between the time intervals, 4-D seismic datasets such as those that yielded the seismic traces shown are "like-enough" to be inverted for fluid monitoring purposes. That is, over the short time intervals between 3-D seismic surveys, basic lithology is presumed to stay essentially unchanged, and observed variations are presumed to be caused by dynamic evolution of fluid flow.

Preprocessing

The elimination of changes caused by data acquisition and processing is essential for successful investigation of 4-D hydrodynamic changes in reservoirs. Like the method disclosed in the Previous Application employing seismic amplitude differencing, to accomplish 4-D analysis, the datasets taken at different times must be processed to be coincident in spatial extent, orientation and resolution. Unlike 4-D seismic amplitude differencing technologies, however, frequency matching between the 4-D seismic datasets is not necessary in the seismic inversion approach used herein to analyze 4-D seismic datasets. The nonlinear inversion technique used is capable of eliminating data acquisition and processing effects by using dynamically extracted seismic source functions. However, since seismic amplitudes of 4-D seismic datasets are relative, amplitude normalization and phase matching must be performed on these datasets to recover true amplitude differences when inverting to derive acoustic impedance.

Thus, an initial step to be taken with each 3-D seismic dataset is to normalize each seismic volume by matching the maximum absolute amplitude using amplitude histograms of each survey. Subsequently, synthetic seismograms from several wells within the subsurface regions being studied that have sonic and density logs can be used to calibrate amplitude magnitude of the seismic traces at well locations to determine the scaling factors for the normalized seismic volumes. These scaling factors can then be applied to the data for the different seismic volumes to normalize seismic amplitudes. Subsequently, the extracted seismic source functions may be normalized to unity so that the reflectivity functions derived from the inverted acoustic impedances can be compared and matched with observations.

Well Log Analysis For The 3-D and 4-D Impedance Inversion

Our nonlinear inversion of 3-D and 4-D seismic data requires an a priori reference model in order to reduce the nonuniqueness in the inverted acoustic impedance functions. The geological and geophysical constraints needed for this reference model are derived from well logs.

Wells have various type of logs. For example, spontaneous potential (SP), gamma ray log (GR), resistivity and induction (ILD) logs exist in almost all wells. Sonic and bulk density logs are only available in some wells. The limited sonic data availability may be overcome by using the correlation between sonic and other logs to empirically calculate a "pseudo" sonic log (a common technique in petrophysical analysis), see, e.g., J. Brock, 1984, Analyzing Your Logs, Vol. II: Advanced Open Hole Log Interpretation, Petromedia. In wells without density logs, we use the inverse Gardner relationship to calculate density logs from measured or estimated sonic logs. (See, G. H. F. Gardner, L. W. Gardner, and A. R. Gregory, 1974, "Formation Velocity and Density—The Diagnostic Basics For Stratigraphic Traps," Geophysics, v. 39, no. 6, pp. 770–780.)

Acoustic impedance is measured by density and sonic logs, i.e., $\rho \cdot v$, and is a function of lithology, porosity, fluid saturation, and effective pressure. However, both sonic and bulk density logs do not exist in all wells, thus it is often necessary to compute "pseudo" sonic and density logs from other logs in some wells to constrain and examine our seismic inversion results. Since the inverted acoustic impedance functions are in travel time whereas well logs are measured in depth, logs must be converted from depth to two-way travel times using the sonic log and/or "checkshot" Vertical Seismic Profile data. Synthetic seismograms generated from sonic logs may be used to compare two-way travel times of reflectors in the seismic data with logs to verify the depth-time conversion.

Figure 2A:
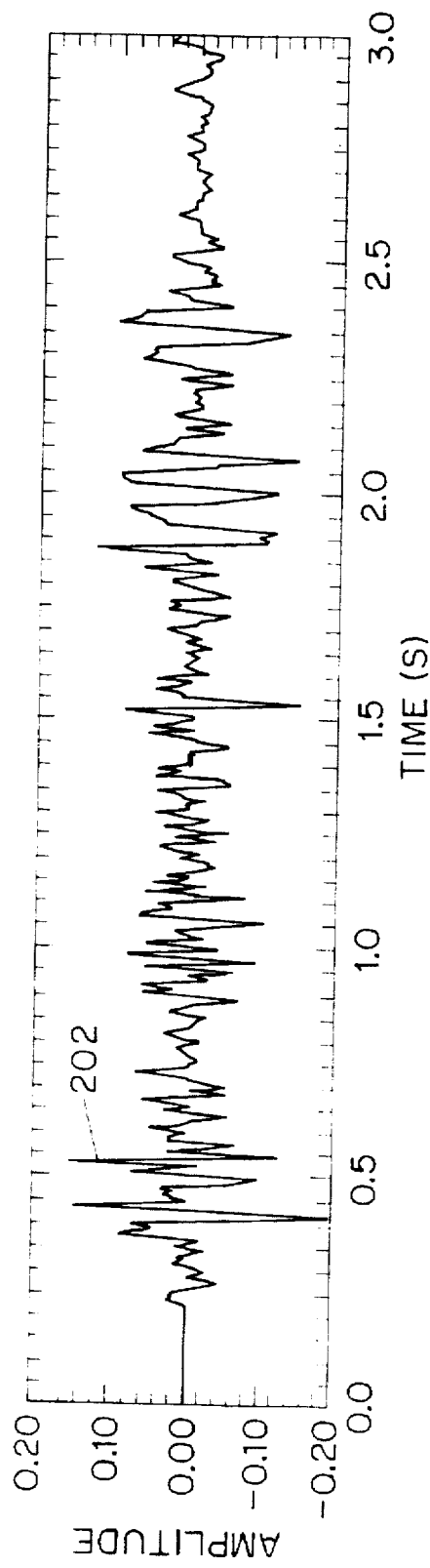
FIG. 2(a) shows a seismic amplitude trace from a 3-D seismic survey, at the same location as an existing vertical well.
Figure 2B:
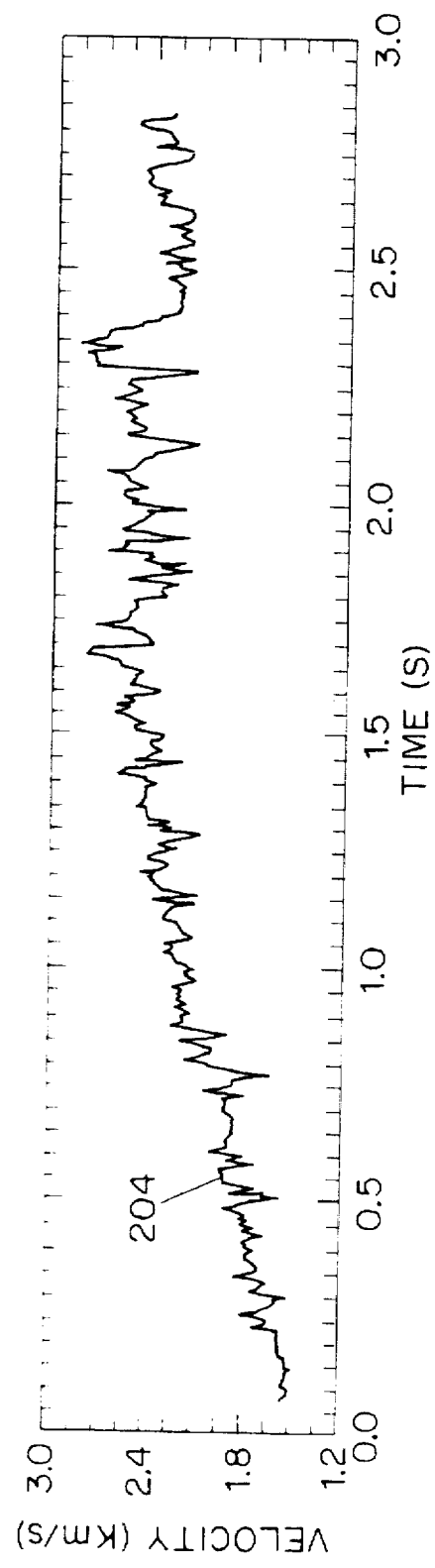

FIGS. 2(a)–(d) show seismic and well log data measured at the same location. FIG. 2(a) shows a seismic trace (202) in amplitude versus two-way travel time (which, as noted, may be equated to depth with appropriate knowledge of sonic velocities within the strata being studied). FIGS. 2(b) and 2(c) respectively show the sonic velocity log (204) and bulk density log (206) measured from well logs as a function of time/depth. FIG. 2(d) shows the acoustic impedance log (208) calculated from the velocity and density logs shown in FIGS. 2(b) and (c). The major features in both the seismic and the well log data are shown to be aligned. Also shown in FIG. 2(d) as a dotted curve (210) is the low-frequency trend of the acoustic impedance log (208). This curve (210) may be thought of as the compaction trend of the strata being studied. In practicing the preferred embodiment, the low frequency trend was a polynomial (third degree) regression of the impedance log, but any appropriate fit may be used. This low frequency trend of impedance derived from actual well log measurements is used both as an initial model and to constrain the inversion of the 3-D seismic data sets, as will be described further below.

The band-limited nature of observed seismic datasets, typically limited to between 5 and 60 Hz, requires that the inverted acoustic impedance functions, i.e., the short wave length model parameter (see, e.g., A. Tarantola, 1984, "Inversion of Seismic Reflection Data in The Acoustic Approximation," Geophysics, v. 49, pp. 1259–1266; and A. Tarantola and B. Valette, 1982, "Inversion=Quest For Information," Geophysics, v. 50, pp. 159–170), should also be within a confined frequency bandwidth in order to have physical meaning. In other words, one can not obtain inverted acoustic impedance functions that have much higher frequency than that of the observed seismic data. Furthermore, because the observed seismic data are a relative measure of vertical acoustic impedance changes, the nonuniqueness in the inverted acoustic impedance may only be reduced by superimposing certain impedance constraints onto the seismic inversion. Therefore, the trend analysis (210) of impedance derived from well logs is used to establish these constraints (FIG. 2). Such low-frequency well log constraints that are derived from well logging also stabilize the ill-conditioned, iterative, seismic inversion. Because the frequency content of sonic logs (10 kHz) measured in wireline logging program is much higher than that of reflection seismic experiments (<100 Hz), the higher frequency impedance constraints from logs that exceed the seismic Nyquisit frequency may not be applicable to seismic inversions. Instead, since the observed seismic data contain information between the frequency range from 5 to 60 Hz, the low-frequency impedance constraints derived from well logs are sufficient to allow nonlinear seismic inversion to converge on the inverted acoustic impedance solution.

Figure 3C:
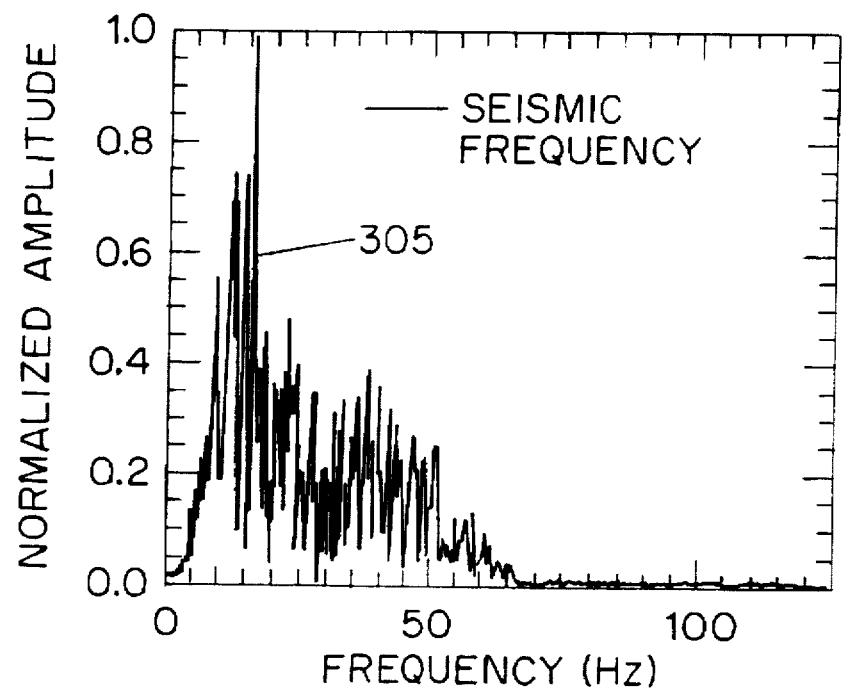
FIG. 3(c) shows the frequency spectrum of the seismic trace shown in FIG. 3(a).
Figure 3D:
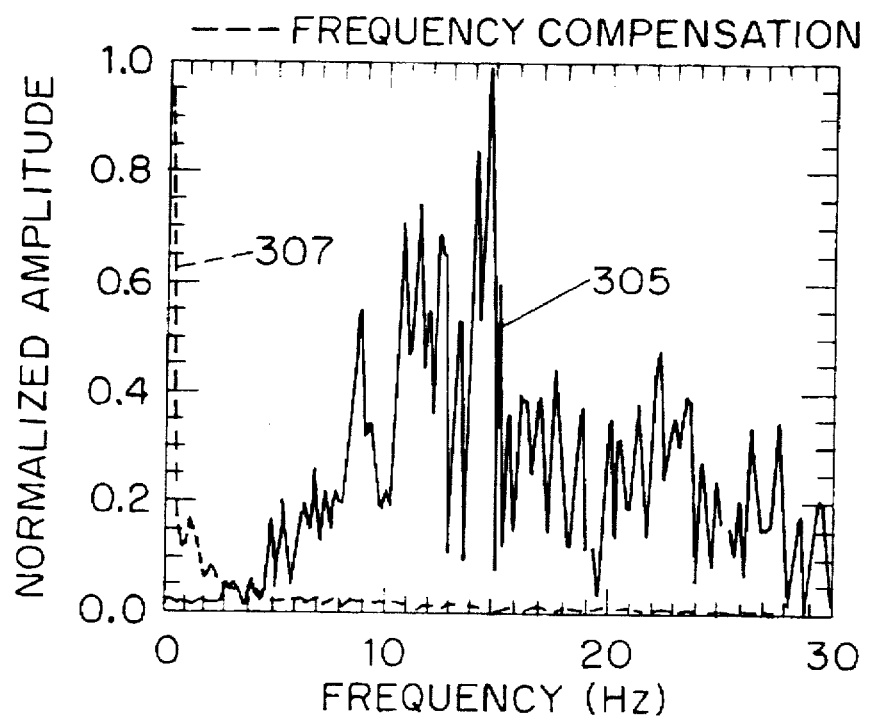
FIG. 3(d) shows the frequency spectrum of the seismic trace shown in FIG. 3(c) corrected to compensate for the low frequency trend of the impedance data shown in FIG. 3(b).

As noted above, the observed seismic traces (301), shown for example in FIG. 3(a), contain only a limited bandwidth, typically between 5 and 60 Hz due to processing constraints. Since the impedance inversion algorithm used does not recover low-frequency information because the inversion algorithm used is based on local perturbations which contain only high-frequency information, in the preferred embodiment the low-frequency compaction trend (303) derived from well logs and shown in FIG. 3(b) was incorporated into the inversion process through the use of a covariance function based on an a priori impedance model. For example, FIG. 3(c) shows the amplitude spectra (305) of the seismic trace (301) shown in FIG. 3(a). Compensation by the compaction trend for the missing frequency bandwidth below approximately 5 Hz is shown by the dotted curve (307) in FIG. 3(d). The compensation for low-frequency is imposed onto the impedance solution by incorporating the a priori low-frequency trend model into the objective function used in the inversion process as detailed below.

In carrying out the preferred embodiment described herein, we selected only some of the wells containing both sonic and density logs from the study volume to construct an a priori acoustic impedance model for the seismic inversion as described below. Because our nonlinear seismic inversion only uses the low-frequency compaction trends of acoustic impedance from the selected wells, other well logs can be used to examine the accuracy of our 3-D and 4-D inverted acoustic impedance result through "blind-tests," i.e., a comparison to well data not used in creating the initial model.

A Priori Acoustic Impedance Model Construction

Our nonlinear inversion is a one-dimensional inversion algorithm, and thus the a priori impedance model has to be constructed for each seismic trace of the oriented 3-D seismic volumes. The a priori impedance model does not have to have high resolution before the inversion is begun and we have found that the compaction trend serves as an appropriate initial model. Using impedance logs from some wells in the study area, we construct a 3-D impedance model that contains only the low-frequency trend of the acoustic impedance function, (210) and (303) as shown in FIGS. 2(d) and 3(b). In constructing this a priori impedance model in three dimensions, we first extracted the compaction trends using a third degree polynomial fit to the impedance log data at each well location used. Then we convert low-frequency impedance logs in depth to two-way travel time using the sonic logs at each well. The a priori low-frequency impedance model at each location in the 3-D survey area in time was constructed by linearly interpolating these impedance logs into the common seismic grid in 3-D. Any other suitable interpolation or estimation scheme may of course be used. Each vertical trace of this model is then treated as the reference impedance model and the initial model in performing our seismic inversion.

Knowing the initial impedance and the reference models alone is not sufficient to constrain the inversion process because these constraints must be systematically incorporated into the model parameter estimation. Accordingly, in the preferred embodiment of the 3-D and 4-D nonlinear inversion technique we incorporate the covariance functions in both data and model space to constrain the inversion process. The use of those covariance functions has two proposes: (1) it ensures that the results are physically meaningful in terms of continuity and proximity to the compaction trend; and (2) it allows for computational efficiency by vastly reducing the domain of acceptable solutions. Due to the difficulty in estimating the true covariance functions without a large number of repeated seismic and logging experiments, covariance functions that have Gaussian distribution properties, for example, may be implemented to estimate uncertainties in data space and model space. Such Gaussian distribution functions were used in practicing the preferred embodiment.

Nonlinear Inversion of 4-D Seismic Datasets

Given that the reflection interfaces cannot be exactly interpreted, the full-scale nonlinear inversion of seismic waveforms disclosed herein is believed to be the most robust and accurate technique to invert real seismic data. Each 3-D seismic dataset of the same subsurface region being studied is independently inverted by sharing the same a priori low-frequency impedance and initial impedance models. Once computed, the covariance functions that describe uncertainties in estimated impedance functions and the observed seismic traces are calculated for each seismic trace of each survey to ensure that the inversion of 4-D seismic datasets is accomplished under the same set of constraints and optimized with the same uncertainties.

We also realize that it is, in fact, very difficult to use one-dimensional seismic inversion techniques to invert 3-D seismic datasets. The potential problems are numerical instability of the inversion algorithm and inconsistency between the inverted acoustic impedance volumes. The modified Levenberg-Marquardt minimization algorithm used in the preferred embodiment as described below behaves well in optimizing the large number of model parameters. (See, e.g., K. Levenberg, 1944, "A Method For The Solution of Certain Nonlinear Problems in Least Squares," *Quarterly of Applied Mathematics*, v. 2, pp. 164–168; D. W. Marquardt, 1963, "An Algorithm For Least-Squares Estimation of Nonlinear Parameters," *Journal of Society of Industrial and Applied Mathematics*, v. 11, pp. 431–441; and J. More, 1977, "The Levenberg-Marquardt Algorithm, Implementation and Theory," *Numerical Analysis*, G. A. Watson, Editor, Lecture Notes in Mathematics 630, Spring-Verlag.) The low-frequency constraints of the initial model have proven to be effective in significantly reducing the nonuniqueness of the inverted acoustic impedance volumes.

After construction of an impedance model by interpolation of the well data and calculation of the compaction trend, the next step of the full-scale nonlinear seismic inversion is to extract seismic source functions or wavelets from each observed seismic trace of each 3-D seismic survey. Impedance Z, in seismic studies is of course derived from the reflection coefficient, R, between consecutive stratigraphic layers i and j:

$$R = \frac{Z_j - Z_i}{Z_i + Z_j}$$

The observed seismic trace, S, is typically modeled as the convolution of an interpretive "wavelet" or seismic source function, W, with the reflection coefficient, R:

$$S = W * R$$

Figure 4:
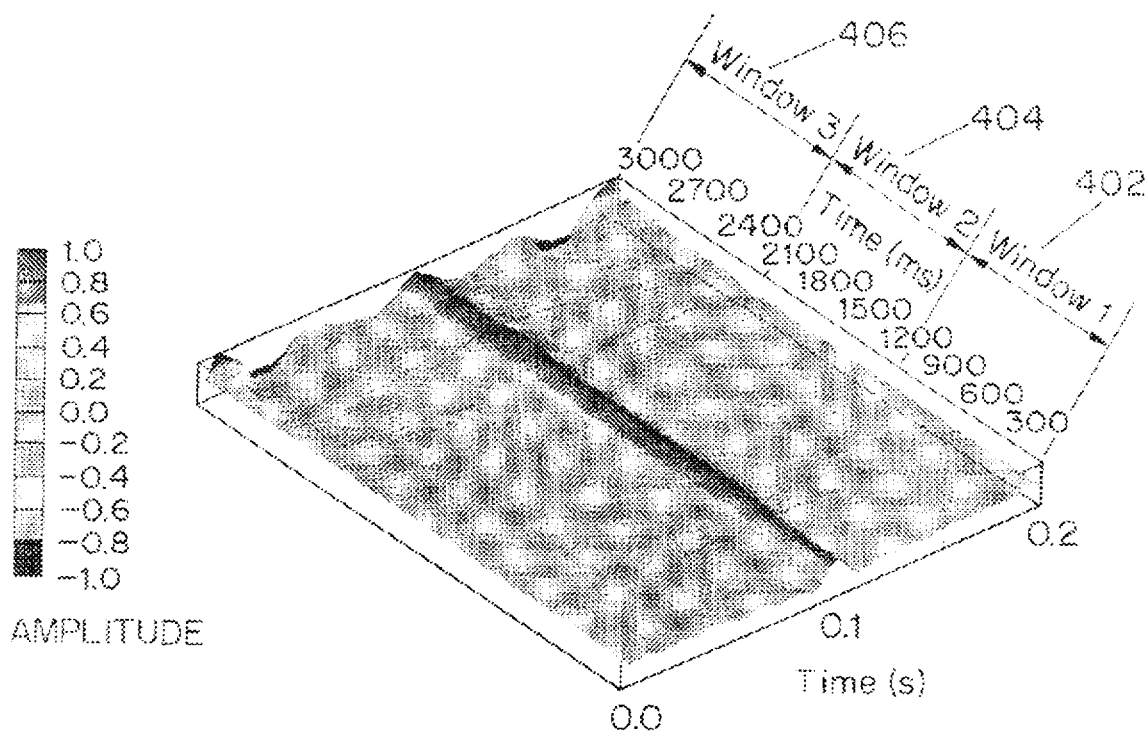
FIG. 4 shows the time dependant seismic source function for the 1985 seismic trace shown in FIG. 1(a) estimated by the autocorrelation function extracted from the seismic trace.
Figure 5:
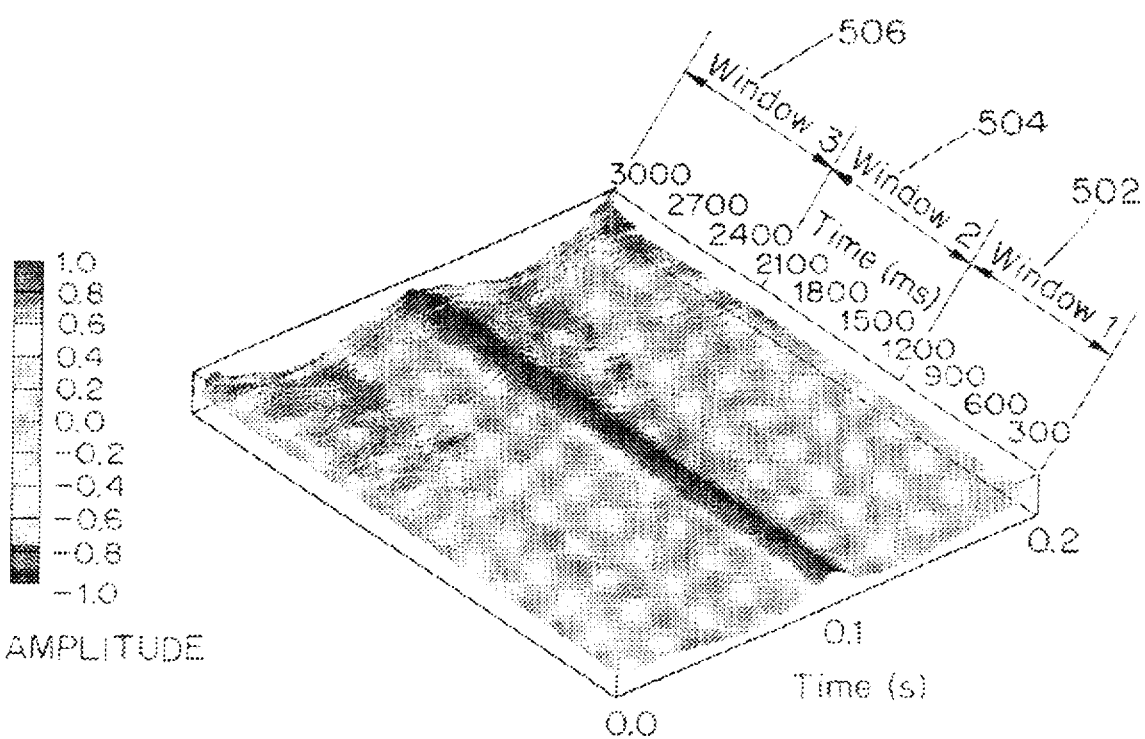
FIG. 5 shows the time dependant seismic source function extracted from the seismic trace shown in FIG. 1(b).

In practicing the preferred embodiment, instead of using one static source function or wavelet in the convolution forward model to invert the entire seismic volume (as is the present state-of-the-art, see, e.g., R. Martinez, J. Schroeder, and G. King, 1991, "Formation Pressure Prediction With Seismic Data From Gulf of Mexico," *Society of Petroleum Eng., Formation Evaluation*, no. 3, pp. 27–32), we dynamically extract time/depth varying source functions from each seismic trace in the 4-D volume to be inverted. Such time/depth dependant source functions are shown in FIGS. 4 and 5.

Figure 1B:
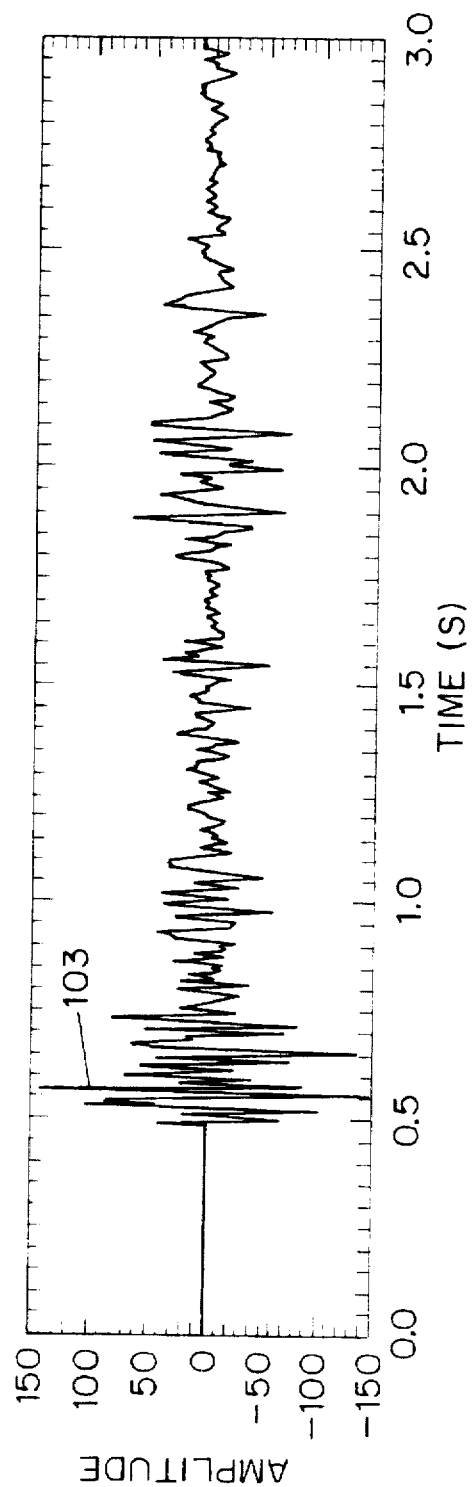

The source functions used in practicing preferred embodiment were determined from the time-variant autocorrelation function of each seismic trace. Because the autocorrelation function of a digital signal is associated with its power spectrum, and the function, itself is one of many possible wavelets (see, e.g., E. Robinson, "Predictive Decomposition of Time Series With Application to Seismic Exploration," *Geophysics*, 161.32, pp. 418–484), we use the autocorrelation function of the seismic trace because it eliminates artifacts introduced by post-stack processing. During the inversion of 4-D seismic datasets, we have the source functions to be zero-phase and, thus, the source functions for each 3-D dataset will vary only in frequency and amplitude. FIGS. 4 and 5 show the time/depth dependant autocorrelation functions for the source function extractions of the seismic traces at Times 1 (1985) and 2 (1992) shown in FIG. 1.

Each source function is shown to be broken into three time/depth dependant zones; a shallow zone, 0–1 seconds (402, 502); a middle zone 1–2 seconds (404, 504); and a deep zone, 2–3 seconds (406, 506). A representative autocorrelation function is chosen from each zone to estimate the wavelet for each trace at those depths/times. Other time/depth dependant approaches may of course be used in practicing the invention, depending in part on the computational resources available. Comparing the seismic source functions in FIGS. 4 and 5, we can see that the seismic source functions used in the inversion processes are different in both frequency content and smoothness. These differences are caused by varying seismic data processing parameters between surveys.

The advantages of using such dynamic source functions are that they can be used to eliminate data processing effects in 4-D seismic datasets which are introduced by using different processing parameters after stacking and migration processes. Use of a static source function may underestimate the frequency bandwidth in high frequency reflection data and overestimate the bandwidth in low frequency seismic data because the frequency changes in depth are ignored. Use of dynamic source functions force the inverted acoustic impedance function to have the same frequency bandwidth as the original seismic trace. The bandwidth of the impedance function is the frequency range of its Fourier Spectrum. Using time-variant seismic source functions, the spatial variation of frequency bandwidth of the impedance function in the inverted acoustic impedance volumes are more likely to be internally consistent because the artifacts of the data processing and variable bandwidths with time/depth are compensated for.

Inverting Impedance Volumes from 4-D Seismic Dataset

As noted above, covariance functions in both data space and model space are used to constrain the inversion process from observed seismic data to modeled impedance. Observed seismic data are usually contaminated by multiple reflections, side reflections, and noises. Assuming the contamination in observed seismic datasets is random, we are able to incorporate the distribution of contamination into the inversion process by using a covariance function, termed the data covariance function, which is the measure of uncertainties in observed seismic data. It is also understood that the inversion for model parameters from a set of observations is also a random process (W. Menke, 1984, "Geophysical Data Analysis—Discrete Inverse Theory," Academic Press, Inc., Orlando, Fla.). Thus, we also need to estimate the uncertainties in model space as well. Since it is impossible to estimate the real covariance function in model space without a large number of repeated experiments, we assume that the estimated model parameters, i.e., the acoustic impedance functions in our case, follow the Gaussian distribution law as we have for the observed data. By doing so, we make the assumption that the inverted acoustic impedance at each sample location is expected to have a Gaussian type of probability centered at its mean, and thus the confidence level can be determined if the inverted impedance falls within the specified variance range. Naturally, the impedance value of the a priori low-frequency impedance model derived from well logs is the estimated mean at each sample point in the impedance volume. In practicing the preferred embodiment we assumed the variance of the impedance value to be inverted is about 20% of its mean. We chose 20% because the range of true impedance typically will not exceed 20% of its mean, but other suitable variations may be chosen by those skilled in the art. We were then able to invert the 4-D seismic datasets trace by trace under constraints of the a priori acoustic impedance model.

In practicing the preferred embodiment, trace by trace, throughout each observed seismic volumes, the inverted acoustic impedance volume of each was computed iteratively using the data and modeled covariance until variations within $10^{-6}$ in impedance was achieved. Corrections to the model for each iteration were determined by effectively computing the gradient between the modeled and actual seismic data through an objective function.

After construction of the a priori reference model of the impedance function $Imp_{ref}$ using log data in the entire seismic volume, the covariance function $c_m$ is computed. In practice, the theoretical covariance function $c_m$ is used as an estimate of the model. In our case, the covariance function $c_m$ is given by:

$$C_m = \begin{pmatrix} g_0^m & & & & \\ & g_1^m & & & \\ & & \cdot & & \\ & & & \cdot & \\ & & & & g_{n-1}^m \end{pmatrix}, n = 751, \quad (1)$$

where $g^m_i$ is a weighting function used to estimate the ith model parameter. It is estimated by using the analytical function, which has a narrow Gaussian type of probability, given by:

$$g_i^m(k) = (\sigma_i^m)^2 \exp\left\{ -0.5\left[\frac{(t_i - t_k)^2}{L_v^2}\right] \right\}. \quad (2)$$

(A. Tarantola, 1984, "Inversion of Seismic Reflection Data in The Acoustic Approximation," Geophysics, v. 49, pp. 1259–1266.) Where $\sigma^m_i$ is the variance of the ith sample of the impedance function. $L_v$ is the time window within which one expects the estimated impedance to be smooth. Because seismic resolution is lower than that of the impedance log derived from well logs, $L_v$ was set to 28 ms in length (7 samples at the 4 ms sampling rate). $\sigma^m_i$ was set to 20% of the impedance value at the ith sample of the reference impedance model $Imp_{ref}$, $t_i$ is the coordinate at the ith sample of the impedance function, and $t_k$ is the time coordinate of the neighboring points, $$K = \frac{L_v}{2}, \frac{L_v}{2}.$$

The minimum of $g^m_i$ is at k=0.

Next the covariance function of the seismic data, $c_d$ was computed. Again, the convolutional model of acoustic impedance is not perfect for real seismic data, and it is extremely difficult to actually estimate uncertainties in modeled seismic data. The observed seismic data is also assumed to have a narrow Gaussian type of probability distribution function. Given a reasonable variance for each sample, it is computed by:

$$C_d = \begin{pmatrix} g_0^d & & & & \\ & g_1^d & & & \\ & & \cdot & & \\ & & & \cdot & \\ & & & & g_{m-1}^d \end{pmatrix}, m = 751, \quad (3)$$

where $g^d_i$ is again estimated in the from $$g_i^d(k) = (\sigma_i^d)^2 \exp\left\{ -0.5\left[\frac{(t_i - t_k)^2}{L_v^2}\right] \right\}. \quad (4)$$

$\sigma^d_i$ is the variance of observed amplitude at the ith sample. the actual value of $\sigma^d_i$ was set to 10% of the absolute maximum seismic amplitude of the entire seismic volume. Parameters $t_i$ and $t_k$ are the same as in Step 1, and $L_v$ is also set to 28 ms (7 samples at the 4 ms sample rate).

Next the seismic source functions, $W_i$ (i=1, 2, . . . ), from the seismic trace, $d_{obs}$ is estimated. By computing the time-variant, autocorrelation function of each seismic trace, the number of seismic source functions is determined. Seismic source functions, shown for example in FIGS. 4 and 5, for each seismic trace are extracted independently throughout the seismic volume.

The objective function is then computed, starting from an initial impedance function $m^{(O)}$, $m^{(O)}=Imp^{(O)}$. In practicing the preferred embodiment, we set the initial model equal to the reference impedance model $Imp_{ref}$. The modeled seismic trace $d^{(O)}_m$ at first iteration is generated by the convolution model that convolves $W_i$ (i=1, 2, ...) with the reflectivity function derived from $m^{(O)}$ in different time windows. The objective function $F^{(O)}(m)$ at point $m^{(O)}$ is then computed as:

$$F^{(O)}(m)=(d_{obs}-d^{(O)}_m)^T(c_d)^{-1}(d_{obs}-d^{(O)}_m)+(m_{ref}-m^{(O)})^T(c_m)^{-1}(m_{ref}-m^{(O)}). \quad (5)$$

This objective function reflects the difference between the observed and modeled data.

The current gradient matrix of the objective function was then computed with respect to each model parameter by using the forward difference algorithm:

$$\frac{\partial F^{(O)}(m_{ref})}{\partial m_j} \equiv \frac{F(m_{ref}+\delta m_j)-F^{(O)}(m_{ref})}{\delta m_j} \quad (6)$$

The objective function $F^{(O)}(m)$ is reduced by searching for proper iteration steps $\Delta m$ to update the current model $m^{(O)}$. This step is accomplished in the modified Levenberg-Marquardt algorithm. (See, e.g., J. More, 1977, "The Levenberg-Marquardt Algorithm, Implementation and Theory," *Numerical Analysis*, G. A. Watson, Editor, Lecture Notes in Mathematics 630, Spring-Verlag.)

The search was performed using the nonlinear gradient of the objective function with respect to the model parameters (to second order) to minimize the correct objective function. The new model $m^{(1)}=m^{(O)}+\Delta m$ that reduces the current object function $F^{(O)}(m)$ is chosen and becomes the current model.

After reduction of the objective function we test for convergence criteria. The purpose is to check if sufficient convergence between observed and modeled data has been achieved. In practicing the preferred embodiment, iteration was terminated if either the objective function in Eq. 5 is less than $10^{-6}$ or the relative reduction of the objective function in two consecutive iterations is less than $10^{-8}$. Otherwise, the inversion process reverts to recompute the objective function based on the new model. The objective function is iteratively reduced until the convergence criteria are satisfied.

FIG. 6 shows the results of a "blind" test between the modeled data and well log data measured in well 33_SH_1 within the test area. Data from this well was not used in computing the initial impedance model for the volume being studied. FIG. 6(a) shows the modeled seismic trace (602) after the final iteration of the inversion (dashed line) as being almost identical to the observed seismic trace (604) (solid line). FIG. 6(b) shows the inverted acoustic impedance function (606) (dashed line) sharing the same low-frequency trends as the measured impedance log data (608) (solid line). The major features of the inverted acoustic impedance also match the measured impedance well log data.

Figure 7:
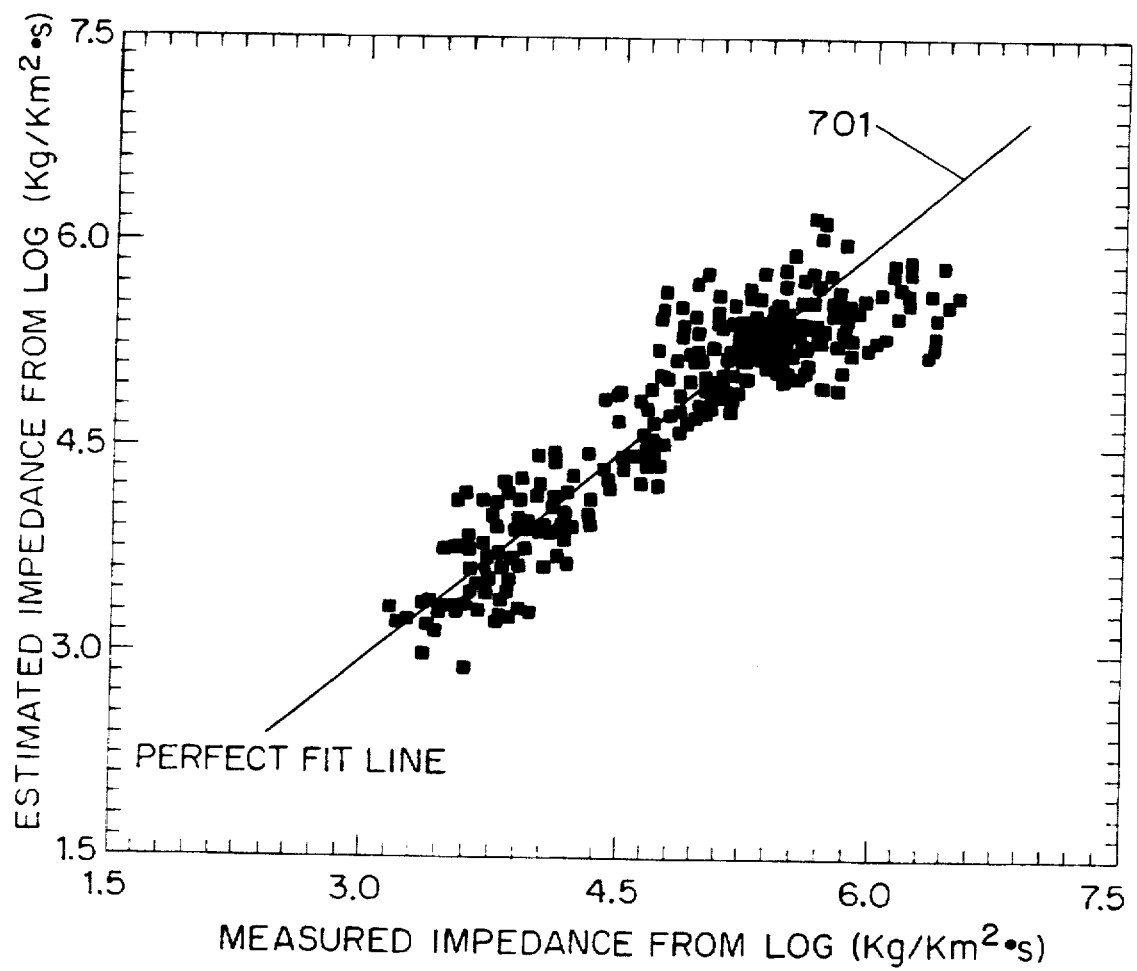
FIG. 7 shows a crossplot of inverted impedance and measured impedance data shown in FIG. 6(b).

FIG. 7 shows a crossplot comparing the inverted acoustic impedance and the measured impedance in well 331_SH_1. The Perfect-Fit Line (701) would result if the inverted impedance function was exactly equal to the true impedance measured in a well. The plot shows the relative error to typically be less than about 10%.

The iterative inversion process used in practicing the preferred embodiment was carried out using a computer subroutine called compute_volume_impedance. A source code listing of subroutine compute_volume_impedance is included in Appendix I.

Region Growing and Differencing

Upon completion of the iterative inversion process detailed above, normalized impedance models of the subsurface region at the different times, e.g. Time 1 (1985) and Time 2 (1992), result.

As with the methodology disclosed in the Previous Application, the resulting impedance models can be used to identify subsurface fluid migration, drainage pathways and regions of bypassed pay in and among hydrocarbon reservoirs. The methodology used is the same as that detailed in the Previous Application except that instead of using seismic attributes, such as the second reflection strength used in the preferred embodiment of the Previous Application, to identify hydrocarbon bearing regions, the impedance model data is used to identify hydrocarbon bearing regions. That is, while in the Previous Application analysis was carried out using 3-D grids comprising voxels representing seismic attributes, here the voxels contain data representing actual petrophysical characteristics, e.g., the local impedance.

Oil and gas bearing zones are characterized by low impedances. This is because oil and gas have low density and seismic velocity compared to water and brine within the pore spaces of reservoir rocks. The seismic "bright spots" associated with these hydrocarbon bearing regions used in the Previous Application should generally conform to the low impedance zones, however, it is generally expected that the impedance models derived through the inversion technique disclosed and claimed herein should more accurately identify the geophysical properties of the subsurface, as compared to the seismic reflection data, due to the constraints imposed by actual well data in deriving the impedance model and due to the fact that the impedance itself is physically associated to the internal properties of reservoirs.

Once the impedance models are complete, it is possible to region grow the hydrocarbon bearing regions to determine both: (1) the large-scale structure and migration pathways of hydrocarbon bearing regions; and (2) identify small-scale regions of dynamic fluid flow and areas of bypassed pay within a hydrocarbon reservoir by differencing the impedance data between seismic surveys within the region grown area.

Figure 8A:
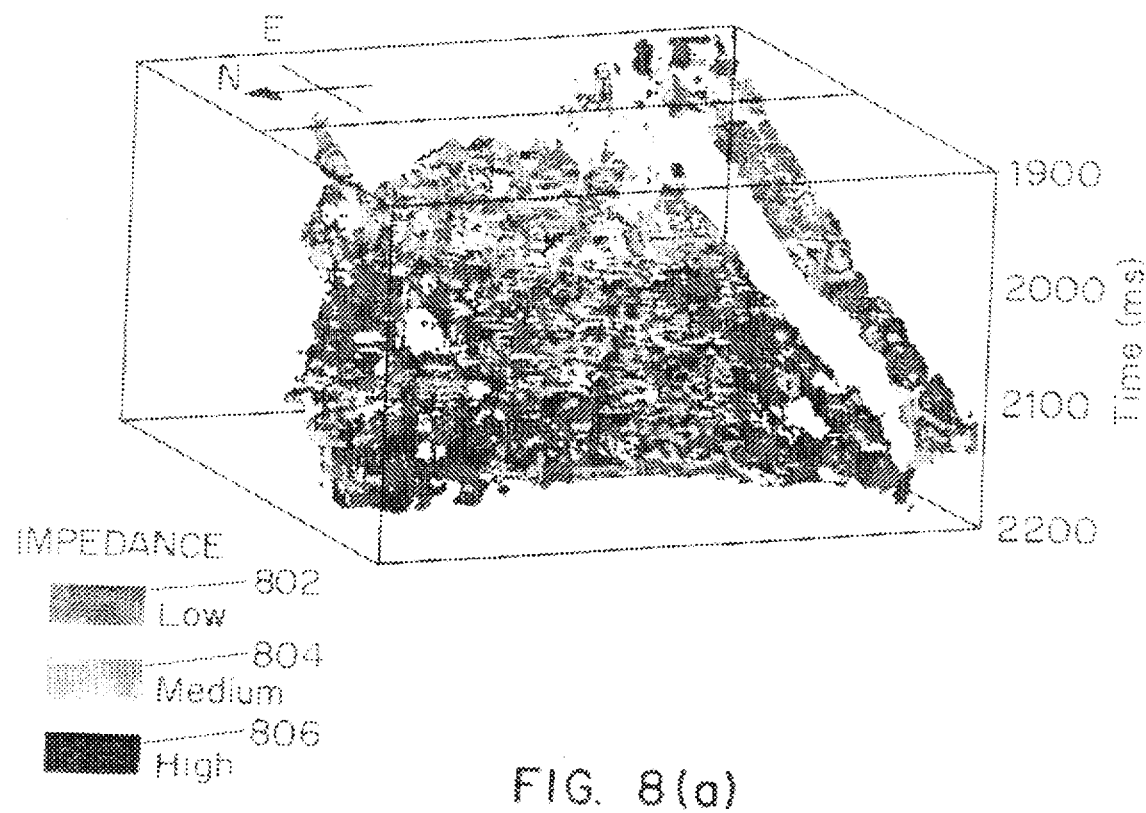
FIG. 8(a) shows a volumetric representation of the region grown acoustic impedance for the LF Reservoir from 1985 including regions of relatively high and low impedance.
Figure 8B:
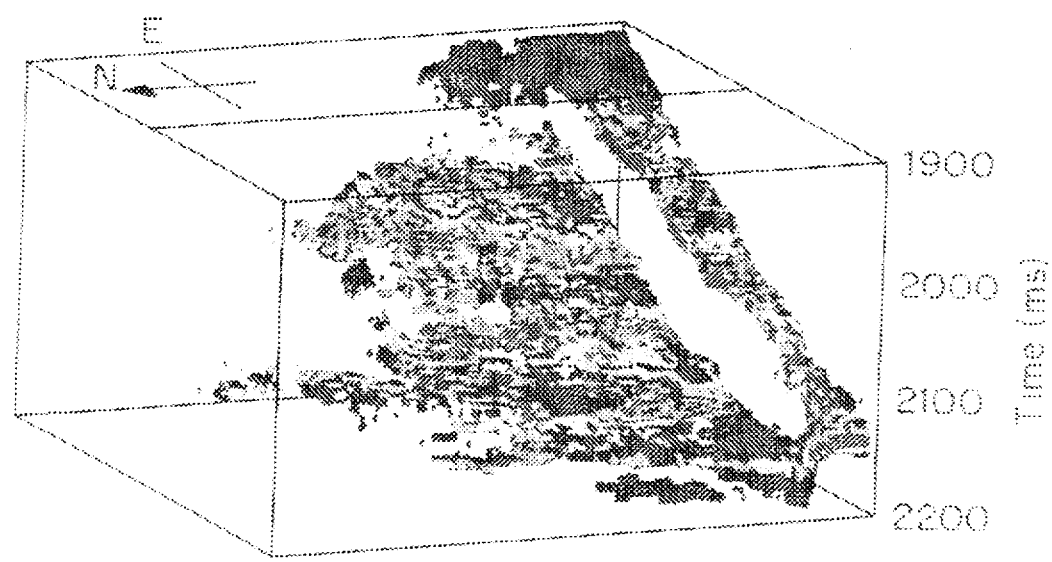
FIG. 8(b) shows a volumetric representation of the region grown acoustic impedance for the LF Reservoir from 1992 including regions of relatively high and low impedance.
Figure 8C:
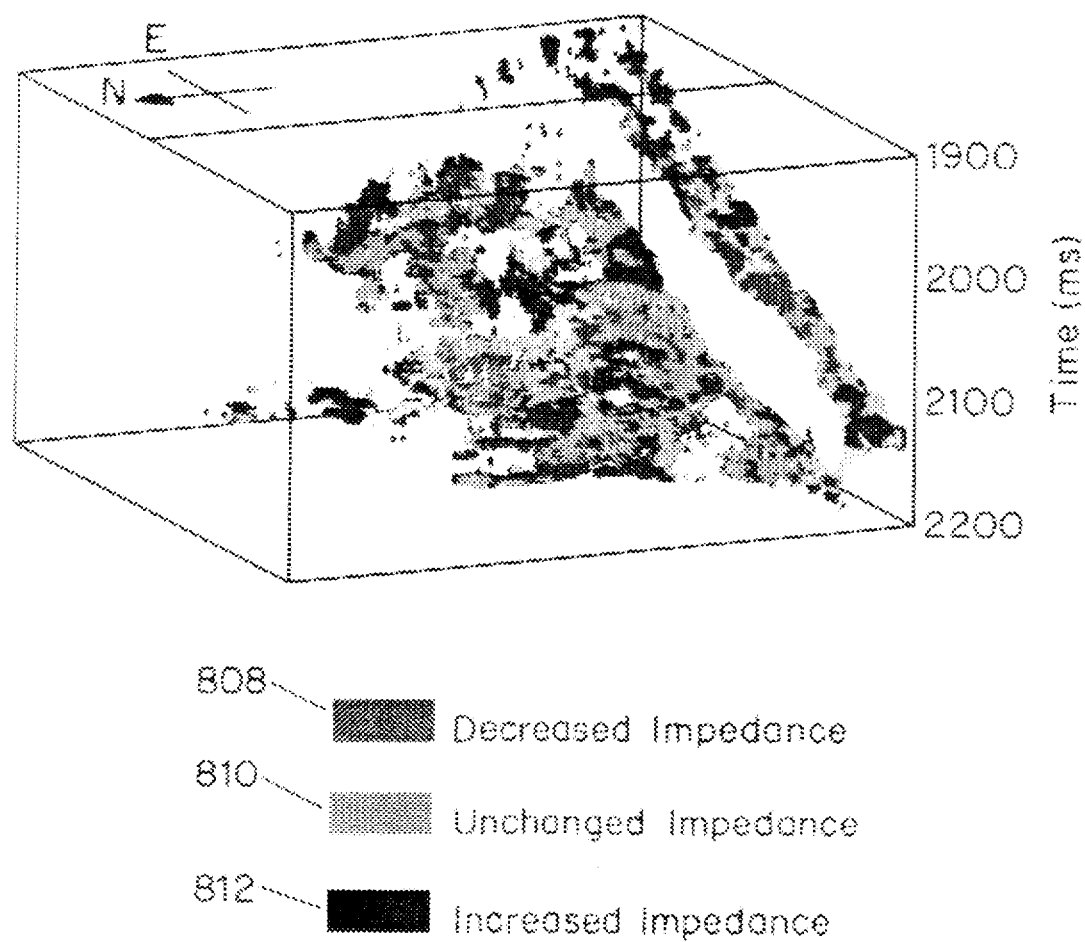
FIG. 8(c) shows a volumetric representation of the 4-D differenced acoustic impedance data using the region grown 1985 and 1992 survey data.

FIGS. 8(a) and 8(b) show the 3-D region grown impedance data for the oil bearing LF Reservoir at Time 1 (1985) and Time 2 (1992), respectively. Similar 3-D structure for the reservoir between surveys is evident from these figures. Regions of low (802), intermediate (804) and higher (806) impedance are shown. FIG. 8(c) shows the volumetric representation of the differences between (i.e., 4-D) the Time 1 and Time 2 region grown data for the LF Reservoir. Areas of decreased (808), unchanged (<10%) (810) and increased (812) impedance are shown. As with the methodology used in the Previous Application, it is possible to run the impedance data through a median filter if there is insufficient connectivity between hydrocarbon bearing sections of the region grown volume. The reader is directed to the median filter, region growing, surface/mesh extraction and advection sections of the Previous Application (including source code listings with illustrative implementations) for a complete description of the methodologies available.

As noted, a principal difference in the present invention is the use of impedance data. Because hydrocarbon bearing regions will have low impedance values, seed points for the region growing technique will have the smallest values rather than the largest values as is the case when region growing using seismic amplitude data is performed. The seismic amplitudes are high or "bright" from hydrocarbon bearing regions because the reflection coefficient of the boundary between water bearing porous rock above and below the oil and gas bearing reservoir rock produce strong, high amplitude signals. Conversely, as noted above, impedance of these regions is low (802). The seed points used in region growing will be the lowest impedance voxels, e.g., lowest 15%, and region growing will continue, for example, up to 55% in the normalized impedance distribution.

Thus, the region growing algorithm used in the Previous Application is simply modified to extract "low" as opposed to "high" values. For example, it may be noted that the exact methodology and computer code disclosed in the Previous Application can be used simply by reversing the sign, i.e., multiplying the impedance values within the volume by "−1." The "lowest" impedances are then the largest numbers within the volumes.

When using the impedance models to analyze 4-D time dependant changes in reservoir characteristics which represent areas of dynamic fluid flow or areas of bypassed pay, as shown graphically in FIG. 8(c), differencing of the region grown impedance data sets corresponding to various seismic surveys taken at different times is done. As in the Previous Application, this data can be used to assist in assessing potential drill sites. Changes in impedance over the short timescale between surveys is presumed to be attributable to migration or production of hydrocarbons.

Decreases in impedance over time (808) are equivalent to increases in seismic amplitude over time which were interpreted in the Previous Application. Decreases in impedance are thus interpreted to be increases in the concentration of natural gas in pore spaces of the reservoir rock as with the formation of a secondary gas cap. Increases in impedance over time (812) are interpreted to be the same as seismic amplitude decreases or dimouts, and are caused by the drainage of oil and gas, and their associated replacement in pore spaces with water and brine. Areas of unchanged impedance (810) between surveys are also identified. Bypassed oil and gas are searched for by looking for sustained areas within the grown region that have maintained low impedance over time, i.e., between surveys.

While we have found region growing to be a necessary step in analyzing seismic high amplitude regions as in the Previous Application, direct differencing will also be effective as an alternative when using inverted impedance data.

As noted above, because the impedance inversion methodology detailed above may in certain circumstances more accurately identify hydrocarbon bearing regions of interest than the analysis of seismic high amplitude regions, direct differencing of model impedance data between surveys, without the need to first region grow to isolate the areas of interest, may accurately map dynamic small-scale changes in hydrocarbon reservoirs, and thus identify regions of interest. Likewise the 3-D impedance models derived through the inversion process detailed above may accurately reflect the large-scale structure and hydrocarbon migration pathways within a subsurface volume without the need for region growing.

Additionally, it is possible to region grow impedance data to identify large-scale 3-D structure and migration pathways or 4-D differences in datasets associated with dynamic evolution, regardless of the source of the impedance data. Thus, while in practicing the preferred embodiment the impedance model was derived using the inversion technique detailed above, the impedance model could originate from numerous methodologies known to those skilled in the art. For example, impedances derived from standard oil industry inversion methods, such as "run-sum" techniques may be used. Run-sum techniques generally involve a downward moving window that calculates a running average which empirically approximates impedance inversion. (See, e.g., R. Sheriff and L. Geldart, 1983, "Data Processing and Interpretation," *Exploration Seismology*, Vol. II, Cambridge Univ. Press, p. 123.)

It is also possible to quantitatively characterize hydrocarbon distribution within a reservoir being studied which has been mapped according to the present invention. It is known to those skilled in the art that lithology of a reservoir may be simulated based on impedance data. For example, a hierarchical sequence such as the Markov-Bayes sequential indicator technique can be used to simulate the lithology of the reservoir. (P. Doyen and T. Guidish, 1992, "Seismic Discrimination of Lithology and Porosity, a Monte Carlo Approach," *Reservoir Geophysics*, R. E. Sheriff, Editor, pp. 243–250.) Then using the lithology distribution as the control, the distributions of porosity and "effective oil saturation" of the reservoir being studied can be estimated by combining the lithology distribution with the impedance data. The empirical relationship has the form:

$$\Phi = \left( \frac{Z - Z_{sand}}{Z_{fluid} - Z_{sand}} \right) - f \left( \frac{Z_{sand} - Z_{shale}}{Z_{fluid} - Z_{shale}} \right) \quad (7)$$

where $\Phi$ is the computed porosity, Z is the estimated acoustic impedance, $Z_{sand}$ is the impedance of the sand matrix, $Z_{fluid}$ is the impedance of water, f is the shale volume fraction derived from the stochastic simulation, and $Z_{shale}$ is the impedance of shale. This relationship has been applied for many years to both sonic and density logs to compute porosities. (See, e.g., L. Coudert, M. Frappa, and R. Arias, "A Statistical Method For Litho-facies Identification," *Journal of Applied Geophysics*, Vol. 32, 1994, pp. 257–267.) We can estimate Effective Oil Saturation by inserting in equation (7) only the normalization to impedance of water as the fluid, i.e., $Z_{fluid} = Z_{water}$. Thus, the oil and gas impedances are intentionally left remaining in the $\Phi$ term, thus reflecting oil and gas saturation. Our modification is to use the impedance in place of the sonic velocity and density. Such quantification of bypassed oil and gas deposits which may be identified using the 3-D and 4-D techniques detailed herein, can thus accurately be used to measure and plan recovery of hydrocarbon reservoirs.

Figure 9A:
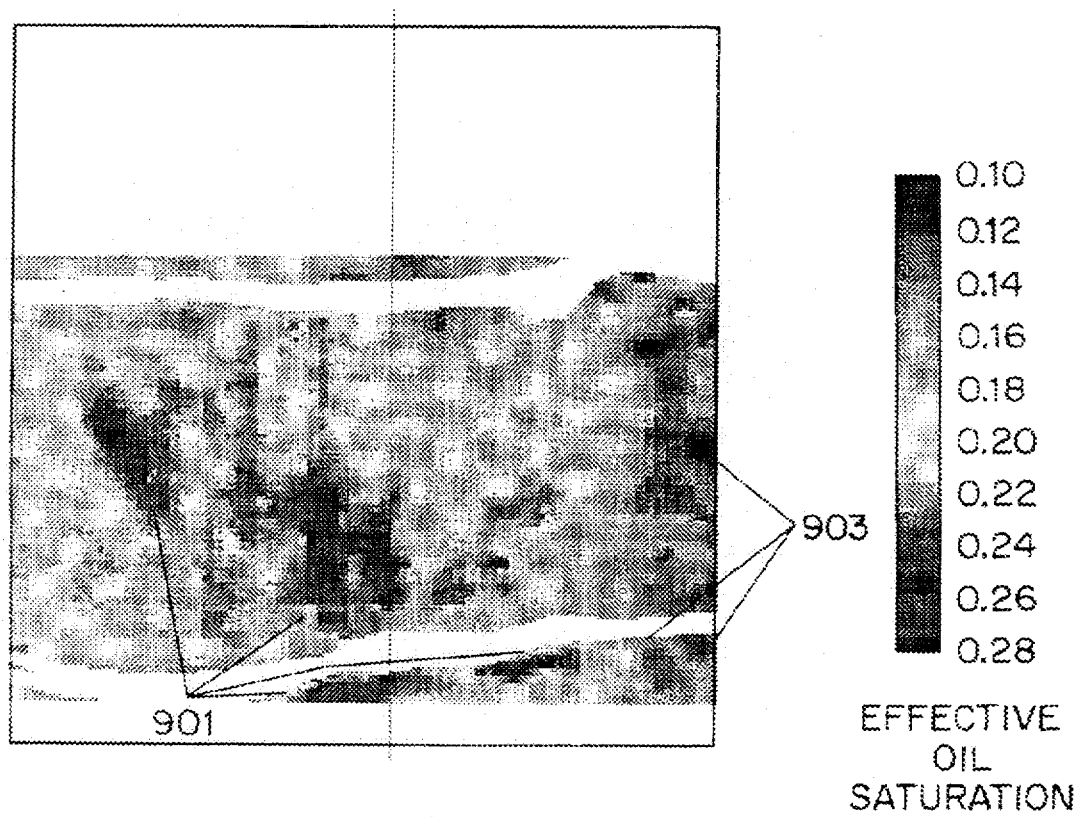
FIG. 9(a) shows a 2-D map of the LF Reservoir detailing the Effective Oil Saturation within the reservoir.

FIG. 9(a) shows the Effective Oil Saturation for a 2-D horizontal map of the LF Reservoir. The Effective Oil Saturation values were calculated using the empirical relationship (7) above. The figure shows the saturation on a scale from high saturation (901) to low relative saturation (903) within the LF Reservoir.

Figure 9B:
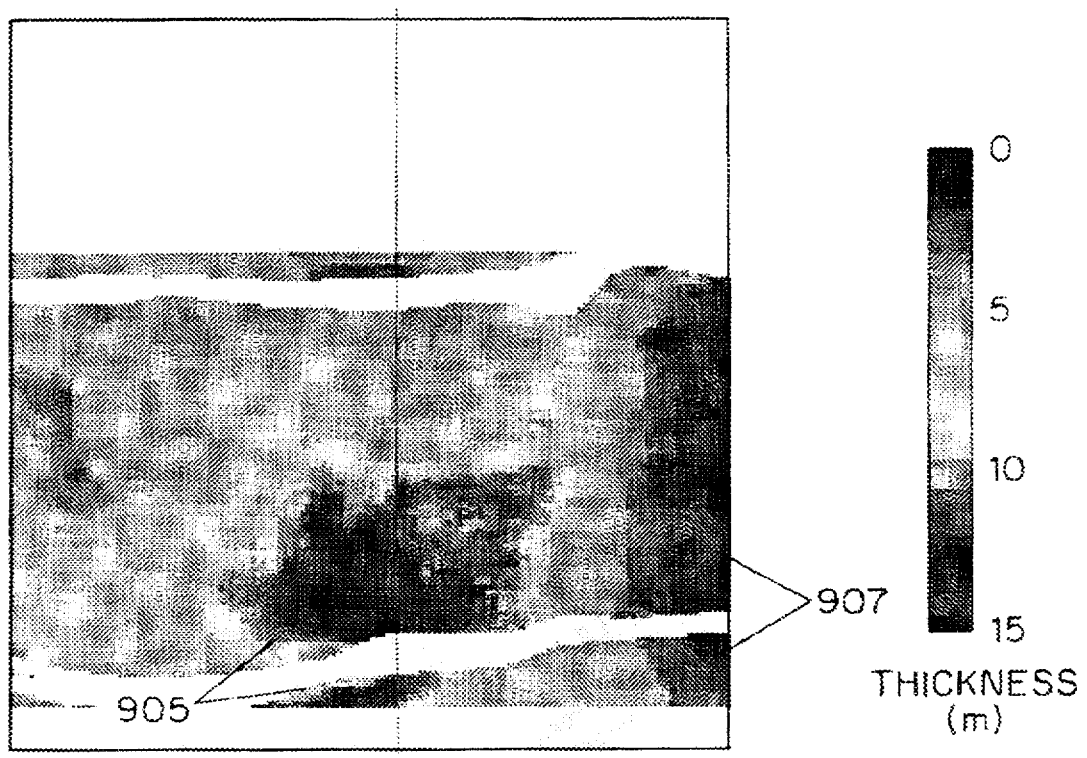
FIG. 9(b) shows a 2-D map of the LF Reservoir detailing the net oil thickness within the reservoir.

One can also plot a net oil thickness map by multiplying a net sand thickness map by the average oil saturation. The net sand thickness map is computed from an isopach map (thickness of the reservoir) by summing the net sand thickness in each voxel within the volume. The net sand thickness in each voxel is calculated by multiplying the total thickness by (1−f), where f is the shale volume fraction. Such a net oil thickness map for a 2-D horizontal map of the LF Reservoir is shown in FIG. 9(b), and was derived from the average oil saturation data illustrated in FIG. 9(a). This net oil thickness map is particularly useful for identifying the bypassed hydrocarbon and computing its economic worth. Potential high recovery regions (905) and expected low recovery regions (907) are easily observed in this map.

The reservoir characterization and quantification using our accurately imaged acoustic impedance volumes combined with well control, can greatly reduce the risk of drilling during reservoir development and can be expected to increase the recovery efficiency in every reservoir in which fluid-derived impedance anomalies are observable.

While the invention has been described in terms of the foregoing specific embodiments thereof, it will be apparent to those skilled in the art that various alterations and modifications may be made to the described embodiments without departing from the scope of the invention, as defined by the appended claims. The processing detailed in the disclosure of the preferred embodiment is provided merely by way of example.

We claim:

1. A method for constructing one or more impedance models of a subsurface volume comprising:

(a) obtaining one or more 3-D seismic image of the subsurface volume from observed seismic reflection trace data derived from seismic surveys;

(b) constructing an a priori impedance model of the subsurface volume based on estimated impedance trends within the subsurface volume, said a priori impedance model initially being substantially identical for each seismic image in recognition that basic lithologic structure remains substantially unchanged during the time interval between seismic surveys;

(c) creating a model of the seismic reflection trace data for the subsurface volume based on the a priori impedance model by combining the a priori impedance model with a seismic source function or wavelet which is time/depth dependent throughout the subsurface region being modeled;

(d) comparing the model and the observed seismic reflection trace data for each seismic image obtained and, if the model seismic reflection trace data and observed seismic reflection trace data vary by more than preselected tolerances, modifying the a priori impedance model corresponding to each seismic survey such that the variation between model and observed seismic reflection trace data will be decreased; and (e) iteratively repeating steps (c) and (d) until the model seismic reflection trace data and observed seismic reflection trace data variations are less than the preselected tolerances.

2. The method of claim 1 wherein:

(a) the a priori impedance model initially constructed in claim element 1(b) is the impedance compaction trend derived from well log data within the subsurface volume; and (b) the a priori impedance model corresponding to each seismic survey is modified per claim element 1(d) by computing a covariance function using the model and observed seismic reflection trace data to derive changes to be made to the a priori impedance model.

3. The method of claim 1 wherein the seismic source function or wavelet is the time/depth dependent autocorrelation function of the observed seismic reflection trace data.

4. A 4-D time dependant method of identifying small-scale structure and regions of fluid and dynamic fluid flow within a hydrocarbon reservoir within a subsurface volume, comprising:

(a) obtaining a plurality of 3-D seismic images of a subsurface volume from seismic reflection traces, said images being spaced in time to allow for dynamic evolution of the hydrocarbon reservoir within the subsurface volume;

(b) processing the plurality of seismic images such that they are coincident in spatial extent orientation and resolution, and normalizing the seismic reflection trace amplitudes so the plurality of 3-D seismic images may be compared;

(c) constructing an impedance model of the subsurface volume including the hydrocarbon reservoir for each seismic image;

(d) identifying impedance attributes associated with the impedance model which are correlated with the presence of hydrocarbons within the subsurface volume for each seismic image;

(e) establishing for each seismic image the extent of regions associated with hydrocarbons based on the impedance model; and (f) identifying intra-reservoir structure by analyzing the differences between the data samples associated with the regions associated with hydrocarbons within the reservoir for each seismic image.

5. The method of claim 4 where the extent of regions associated with hydrocarbons based on the impedance model is accomplished by region growing impedance data samples within the reservoir to a preset threshold.

6. The method of claim 4 where the impedance model of the subsurface volume is constructed pursuant to the steps of claim 1.

7. The method of claim 4 where the impedance model of the subsurface volume is constructed pursuant to the steps of claim 2.

8. The method of claim 4 where the impedance model of the subsurface volume is constructed pursuant to the steps of claim 3.

9. The method of claim 5 where the impedance model of the subsurface volume is constructed pursuant to the steps of claim 1.

10. The method of claim 5 where the impedance model of the subsurface volume is constructed pursuant to the steps of claim 2.

11. The method of claim 5 where the impedance model of the subsurface volume is constructed pursuant to the steps of claim 3.

12. A method of identifying large-scale structure and migration pathways of hydrocarbon bearing regions within a subsurface volume, comprising:

(a) obtaining a 3-D seismic image of the subsurface volume from seismic reflection traces;

(b) constructing an impedance model of the subsurface volume;

(c) identifying impedance attributes associated with the impedance model which are correlated with the presence of hydrocarbons within the subsurface volume; and (d) establishing the extent of regions associated with hydrocarbons based on the impedance model.

13. The method of claim 8 where the extent of regions associated with hydrocarbons based on the impedance model is accomplished by region growing impedance data samples within the subsurface volume to a preset threshold.

14. The method of claim 12 wherein the impedance model of the subsurface volume for each seismic image is constructed pursuant to the steps of claim 1.

15. The method of claim 12 wherein the impedance model of the subsurface volume for each seismic image is constructed pursuant to the steps of claim 2.

16. The method of claim 12 wherein the impedance model of the subsurface volume for each seismic image is constructed pursuant to the steps of claim 3.

17. The method of claim 13 wherein the impedance model of the subsurface volume for each seismic image is constructed pursuant to the steps of claim 1.

18. The method of claim 13 wherein the impedance model of the subsurface volume for each seismic image is constructed pursuant to the steps of claim 2.

19. The method of claim 13 wherein the impedance model of the subsurface volume for each seismic image is constructed pursuant to the steps of claim 3.

20. A method for quantifying hydrocarbon bearing characteristics of a reservoir for reservoir management comprising:

(a) identifying small-scale structure and regions of fluid and dynamic fluid flow within the reservoir pursuant to the steps of claim 4; and (b) converting impedance values of the reservoir into quantitative values of recoverable hydrocarbons, such as oil saturation or oil thickness, within the reservoir.

21. The method for quantifying hydrocarbon bearing characteristics of a reservoir for reservoir management of claim 20 wherein the extent of regions associated with hydrocarbons based on the impedance model is accomplished by region growing impedance data samples within the reservoir to a preset threshold.

22. The method for quantifying hydrocarbon bearing characteristics of a reservoir for reservoir management of claim 20 wherein the small-scale structure and regions of fluid and dynamic fluid flow within the reservoir are identified pursuant to the steps of claim 6.

23. The method for quantifying hydrocarbon bearing characteristics of a reservoir for reservoir management of claim 20 wherein the small-scale structure and regions of fluid and dynamic fluid flow within the reservoir are identified pursuant to the steps of claim 7.

24. The method for quantifying hydrocarbon bearing characteristics of a reservoir for reservoir management of claim 20 wherein the small-scale structure and regions of fluid and dynamic fluid flow within the reservoir are identified pursuant to the steps of claim 8.

25. The method for quantifying hydrocarbon bearing characteristics of a reservoir for reservoir management of claim 20 wherein the small-scale structure and regions of fluid and dynamic fluid flow within the reservoir are identified pursuant to the steps of claim 9.

26. The method for quantifying hydrocarbon bearing characteristics of a reservoir for reservoir management of claim 20 wherein the small-scale structure and regions of fluid and dynamic fluid flow within the reservoir are identified pursuant to the steps of claim 10.

27. The method for quantifying hydrocarbon bearing characteristics of a reservoir for reservoir management of claim 20 wherein the small-scale structure and regions of fluid and dynamic fluid flow within the reservoir are identified pursuant to the steps of claim 11.

* * * * *